Patented Mar. 24, 1936

2,034,889

UNITED STATES PATENT OFFICE 2,034,889

INHIBITOR FOR RUBBER VULCANIZATION

Carl S. Williams, Woodbridge, N. J., assignor, by mesne assignments, to E. I. du Pont de Nemours and Company, a corporation of Delaware No Drawing. Application September 15, 1930, Serial No. 482,147

11 Claims. (Cl. 18—53)

This invention relates to vulcanization of rubber and the chemicals used as an aid thereto. More particularly this invention relates to those materials known as accelerators for the vulcanization of rubber, and specifically, to a material to be used in conjunction with such accelerators for the prevention of prevulcanization or "scorching" of the rubber compound while it is being mixed or on standing after milling.

In the preparation of rubber for vulcanization, it is mixed with a vulcanizing agent, commonly sulphur, and a variety of other materials, some of the most important of which are carbon black, zinc oxide, various rubber substitutes conditioning materials, and the like, such as mineral rubber or pitch, factice, resins, anti-oxidants, etc. In addition to such materials, there is also incorporated a chemical for the purpose of accelerating the vulcanization of the rubber and which is commonly referred to merely as the accelerator.

These various components of the rubber compound are mixed and worked into the raw rubber by means of mixing rolls in a period of twenty to thirty minutes or thereabouts. Due to the friction within the rubber and other effects accompanying the working or milling, a large amount of heat develops in the batch. This heat is usually dissipated to some degree by running cooling water through the mill rolls. This cooling is necessary, since too great a degree of heat applied to such rubber compounds for an appreciable period will cause vulcanization to take place before it is desired, i. e., on the rolls during the milling operation. Such prevulcanization is commonly referred to as scorching. This partial vulcanization or scorching prevents further fabrication of the rubber.

Ordinary mill roll temperature is maintained by cooling at a temperature of about 70° C., but the rubber batch on the rolls during the operation reaches higher temperatures, ofttimes as high as 100–110° C; thus, the milling range of temperature will be from somewhat below 70° C., or say 50° C., up to 110° C., or even more under careless handling.

With some of the active accelerators of vulcanization, rubber compounds have a great tendency to scorch in the upper reaches of this range of temperature, i. e., 100°–110° C. There is also a tendency for such accelerators to cause partial vulcanization to occur if the mixed compound is allowed to stand for a considerable period at the temperature at which it comes from the mill rolls or even at room temperature.

A class of accelerators of vulcanization which has found ready acceptance, because of very desirable characteristics as to speed of vulcanization and the lower temperatures required to cause vulcanization, comprises materials which may be, in general, classified as containing the mercapto-thiazole grouping

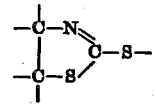

and which are hereafter referred to as mercapto-thiazole accelerators. Such materials are, for example; mercapto aryl thiazoles and their substitution products, such as mercapto benzo thiazole, nitro mercapto benzo thiazoles and the like; addition or reaction products to mercapto aryl thiazoles, such as the reaction products of mercapto benzo thiazoles with amines, or addition products with materials such as diphenylguanidine, or more complex reaction products such as hexamethylenetetramine benzyl mercapto benzo thiazole, the product formed by the reaction of mercapto benzo-thiazole with the reaction product of hexamethylenetetramine and benzyl chloride. In general, however, the use of this type of accelerator is limited to those rubber stocks which can be worked readily and maintained at relatively low temperatures prior to vulcanization, since it has been found that temperatures of up to 100°–110° C. as sometimes occur in the batch on the mill rolls, will cause a partial vulcanization or scorching to take place while mixing and further the compounds tend to vulcanize on standing.

The object of this invention is to provide a material which will inhibit the action of such mercapto-thiazole accelerators so as to prevent any substantial activity on their part at a temperature up to about 100–110° C. in unvulcanized vulcanizable rubber compounds while at the same time not having such deleterious action on the activity of the accelerators as to prevent their functioning at the regular vulcanization temperatures above 110° C. and which furthermore do not have a harmful action on the compounding ingredients, softeners, antioxidants, and the like. My invention permits freer use of the mercapto-thiazole accelerators in that special care to prevent overheating of the mill batch, or special means for cooling the batch during the process of milling, other than cooling water on the rolls, need not be utilized and mixed batches can be allowed to stand longer than usual without setting up.

I have found that by mixing a small amount of a substituted benzoic acid and particularly a mono ortho substituted benzoic acid with the rubber compound, together with the other materials and the mercapto-thiazole accelerator, vulcanization of the rubber at temperatures below about 110° C. is retarded or inhibited, and that subsequent vulcanization at higher temperatures is not adversely affected, and is in some cases enhanced. Salicylic acid, ortho chlor benzoic acid, ortho toluic acid and anthranilic acid are specific examples of the inhibitors of my invention. I have further found that other substituted benzoic acids such as those substituted in the meta or para position have a similar effect, but that the activity as an inhibitor decreases if the substitution be in the meta position, and decreases still further if the substitution be in the para position.

I have furthermore found that certain metal salts of the above mentioned compounds also act as inhibitors within my invention, thus, for example, I have utilized satisfactorily ferrous, calcium, cadmium, magnesium, barium, lead, aluminum and zinc salicylates.

In general the specific substituted benzoic acid or benzoates of my invention are classified as substituted cyclic compounds having a formula

wherein M is a radical of the group comprising hydrogen, ferrous iron, calcium, cadmium, magnesium, barium, lead, aluminum and zinc and X is a radical of the group comprising —NH$_2$, —OH, —CH$_3$ and —Cl, and wherein the substitution may be in ortho, meta or para relationship.

In the practice of my invention, the mercapto-thiazole accelerator and the inhibitor may be added separately to the rubber compound during milling or if the two materials, the accelerator and the inhibitor to be used, are compatible, i. e. if they do not interact to the detriment of the specific action of one or the other or both, the two may be mixed in the proper proportions and stored and utilized in this manner. Thus, for example any of the materials, free acid or metal salt, mentioned above may be mixed with mercapto benzo thiazole. If however, salicylic acid is mixed with a material such as hexamethylenetetramine benzyl mercapto benzo thiazole, a reaction takes place which destroys the accelerating power of this material; however, the metal salicylates, such as zinc salicylate may be mixed with this accelerator and stored for long periods. As shown below the preferable ratios of inhibitor to accelerator in such mixtures will be from about 0.05 to 5 parts inhibitor to one of accelerator.

The amount of inhibitor to be utilized will, to some extent, depend upon the activity of the specific mercapto-thiazole accelerator used and the extent to which inhibiting action is desired. As will be seen from the examples given below, the inhibiting action will carry on regardless of the amount of inhibitor added. However, this action with large amounts of inhibitor will be of such extent that with the normal commercial amount of accelerator used in rubber batches, the final strength secured at normal curing time and temperature will be reduced. I have observed in general that up to approximately 3 parts by weight of inhibitor, no deleterious action is secured at the normal curing time and temperature, but rather that the action of the accelerator seems to have been enhanced to give increased strength; up to 5 parts of the inhibitor may be used without decreasing the ultimate desirable characteristics of the rubber to a very serious extent. I have furthermore found that as little as 0.05 parts by weight of the inhibitor will cause appreciable diminution of the activity of the accelerator at temperatures below 110°. Under normal conditions therefore, I would prefer to use between 0.05 and 5 parts by weight but may use more.

In comparing the metal salts with the free acids in their activity I have found that if an amount of metal salt be used which will give an amount of acid radical equivalent to that shown in the examples, comparable results will be attained.

The following examples will illustrate the benefits to be derived from the use of my inhibitors in rubber compounds using accelerators as described above.

*Example I*

This example is given to show the action of a rubber compound using a mercapto-thiazole accelerator in the absence of any inhibitor.

| | Parts by weight |
|---|---|
| Smoked sheet | 100. |
| Carbon black | 40. |
| Zinc oxide | 10. |
| Sulphur | 3. |
| Mineral rubber | 5. |
| Stearic acid | 2. |
| Hexamethylenetetramine benzyl mercapto benzo thiazole | 1.1 |
| Phenyl beta naphthylamine | 1. |

This formula was mixed on small rolls at a roll temperature of about 70° C. in a small batch, so that the temperature of the batch did not rise over 80° C. thus preventing any deleterious effects on the batch; the batch was then cured in a mold and tested, with results as follows:

| | Elongation | Load at 600% elongation | Tensile at break |
|---|---|---|---|
| 60 min. at 100° C | 710 | 400 | 489 |
| 60 min. at 105° C | 640 | 1100 | 1472 |
| 60 min. at 110° C | 620 | 1850 | 2059 |
| 60 min. at 115° C | 700 | 2200 | 2939 |
| 40 min. at 134° C | 730 | 3000 | 4113 |

From this it is seen that if the temperature of the batch during milling had reached 100° C. for any appreciable period, some scorching or pre-vulcanization would have taken place, and that if this temperature had been maintained for as long as 60 minutes considerable vulcanization would have occurred and the rubber would have been unworkable; furthermore, if the temperature had been at 105° C. for even 5 minutes, the batch would have been seriously harmed.

*Example II*

A rubber batch the same as that of Example I was now prepared and to it was added 0.4 parts by weight of salicylic acid. This batch was mixed on the rolls under the same conditions as prevailed in Example I and then cured in a mold and tested, with results as follows:

|  | Elongation | Load at 600% elongation | Tensile at break |
|---|---|---|---|
| 60 min. at 100° C | Plastic—no vulcanization | | |
| 60 min. at 105° C | Very slight vulcanization | | |
| 60 min. at 110° C | 620 | 1200 | 1347 |
| 60 min. at 115° C | 730 | 3100 | 4396 |
| 40 min. at 134° C | 700 | 3500 | 4853 |

This shows that the rubber batch on the mill roll utilizing hexamethylenetetramine benzyl mercapto benzo thiazole, if it contained 0.4 parts salicylic acid, could have reached and remained at a temperature of 100° C. for 60 minutes with no injurious effects to the rubber compound, and that it could have reached 105° C. for at least a short period such as 20 minutes without being harmed to any appreciable extent, and, furthermore, that at the regular vulcanization time and temperature full strength of the compound was developed.

Example III

This example shows the same effects to be secured by the use of 0.5 parts by weight of ortho toluic acid, in the formula of Example I. The mixing temperature and conditions were those described in Example I and the results, after curing in a mold, were as follows:

|  | Elongation | Load at 600% elongation | Tensile at break |
|---|---|---|---|
| 60 min. at 100° C | Plastic—no vulcanization | | |
| 60 min. at 105° C | Slight vulcanization | | |
| 60 min. at 110° C | 640 | 1600 | 1901 |
| 60 min. at 115° C | 730 | 2800 | 3555 |
| 40 min. at 134° C | 680 | 3450 | 4325 |

Similar effects may be observed with the use of mercapto benzo thiazole as the accelerator.

Example IV—No inhibitor

Formula as in Example I except that 1.2 parts of mercapto benzo thiazole were used as the accelerator.

|  | Elongation | Load at 600% elongation | Tensile at break |
|---|---|---|---|
| 60 min. at 100° C | Plastic—no vulcanization | | |
| 60 min. at 105° C | Slight vulcanization | | |
| 60 min. at 110° C | 640 | 400 | 672 |
| 60 min. at 115° C | 660 | 2100 | 2673 |
| 40 min. at 134° C | 690 | 3200 | 4257 |

Example V

Formula of Example IV was utilized, with the addition of 0.8 part by weight salicylic acid, and cured and tested, with results as follows:

|  | Elongation | Load at 600% elongation | Tensile at break |
|---|---|---|---|
| 60 min. at 100° C | Plastic—no vulcanization | | |
| 60 min. at 105° C | Plastic—no vulcanization | | |
| 60 min. at 110° C | Slight vulcanization—too weak to test | | |
| 60 min. at 115° C | 650 | 1200 | 1563 |
| 40 min. at 134° C | 700 | 3450 | 4352 |

The comparison of Examples IV and V will show that while a rubber containing mercapto benzo thiazole does not tend to scorch as easily as the compound of Example I, nevertheless without the inhibitor a slight curing would take place if the rubber batch were at a temperature of 105° C. for a period of 60 min., but that with the inhibitor, no vulcanization took place in that time at that temperature, and that even at 110° C. very little vulcanization took place with the inhibitor present.

Example VI

The following example will illustrate the effect of varying amounts of inhibitor:

| | Parts by weight |
|---|---|
| Smoked sheet | 100.0 |
| Zinc oxide | 10.0 |
| Carbon black | 40.0 |
| Sulphur | 3.0 |
| Mineral rubber | 5.0 |
| Stearic acid | 2.0 |
| Hexamethylenetetramine benzyl mercapto benzo thiazole | 1.0 |

Batches of this formula were prepared containing, respectively, 0.05, 0.2, 1.0, 3.0, 5.0, and 10.0 parts by weight of salicylic acid. These batches were milled under the conditions as described above in Example I, and then cured in a mold, with the following results:

*A.—60 minutes at 100° C.*

| | |
|---|---|
| 0.05 | Barely appreciable setting |
| 0.2 | No vulcanization |
| 1.0 | No vulcanization |
| 3.0 | No vulcanization |
| 5.0 | No vulcanization |
| 10.0 | No vulcanization |

*B.—60 minutes at 110° C.*

| | Load at 600% elongation | Tensile at break |
|---|---|---|
| 0.05 | 2800 | 3920 |
| 0.2 | 2900 | 3845 |
| 1.0 | 2000 | 2480 |
| 3.0 | 800 | 800 |
| 5.0 | 500 | 550 |
| 10.0 | Too weak to test. | |

*C.—40 minutes at 134° C. (Normal curing time and temperature for this accelerator)*

| | Load at 600% elongation | Tensile at break |
|---|---|---|
| 0.05 | 3600 | 4357 |
| 0.2 | 3450 | 4325 |
| 1.0 | 3600 | 4424 |
| 3.0 | 3500 | 4423 |
| 5.0 | 3300 | 4008 |
| 10.0 | | 1955 |

These results show that the inhibiting effect of salicylic acid increases with the amount of inhibitor added but that there is no lowering of the results with increasing amounts of inhibitor at the normal curing time and temperature until a large amount, such as 5 parts by weight, of salicylic acid were added; these results show that while the amount of vulcanization is reduced at 110° C., at 134° C. an enhanced result is secured with 3% of inhibitor.

Example VII

Effects with increased amounts of accelerator and inhibitor. Formula of Example VI was used except that hexamethylenetetramine benzyl mercapto benzo thiazole was added as the accelerator and salicylic acid as the inhibitor, both in parts by weight as indicated in the tables below:

Cure

| Salicylic acid | Accelerator | 60 minutes at 100° C. | 60 minutes at 110° C. | | 40 minutes at 134° C. | |
|---|---|---|---|---|---|---|
| 0.5 | 1.5 | No vulcanization | 2600 | 3685 | 4000 | 4798 |
|  | 2.0 | do | 3650 | 4767 | 4300 | 4525 |
| 1.0 | 1.1 | do | 2000 | 2480 | 3600 | 4424 |
|  | 1.5 | do | 1800 | 2346 | 4650 | 4737 |
|  | 2.0 | do | 3450 | 4378 |  | 4234 |
| 3.0 | 1.1 |  |  |  |  |  |
|  | 1.5 | do | No vulcanization | | 3850 | 4357 |
|  | 2.0 | do | 2000 | 2610 |  | 4325 |
| 5.0 | 1.1 |  |  |  |  |  |
|  | 1.5 | do | No vulcanization | | 3800 | 4031 |
|  | 2.0 | do | do |  | 4000 | 4000 |

This shows that increase in the amount of accelerator requires increasing amount of inhibitor.

*Example VIII*

The formula of Example VI was utilized to which was added 0.5 part zinc salicylate. This was mixed and cured as in Example VI and gave the following tests.

|  | Elongation | Load at 600% elongation | Tensile |
|---|---|---|---|
| 60 minutes at 100° C | No vulcanization | | |
| 60 minutes at 115° C | 630 | 2375 | 2734 |
| 40 minutes at 134° C | 690 | 3400 | 4268 |

*Example IX*

0.62 part calcium salicylate in formula of Example VI.

|  | Elongation | Load at 600% Elongation | Tensile |
|---|---|---|---|
| 60 minutes at 100° C | No vulcanization | | |
| 60 minutes at 115° C | 630 | 2700 | 2947 |
| 40 minutes at 134° C | 660 | 3500 | 3840 |

*Example X*

0.62 part lead salicylate in formula of Example I.

|  | Elongation | Load at 600% Elongation | Tensile |
|---|---|---|---|
| 60 minutes at 100° C | No vulcanization | | |
| 60 minutes at 115° C | 690 | 3200 | 3754 |
| 40 minutes at 134° C | 680 | 4000 | 4424 |

I claim:

1. A process of treating rubber which comprises combining with unvulcanized rubber a vulcanizing agent, a mercapto aryl thiazole accelerator which normally promotes at least partial vulcanization below 110° C., and a substituted benzoic acid compound to inhibit vulcanization below 110° C. selected from the group of compounds having the formula

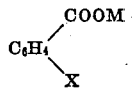

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

2. A process of treating rubber which comprises combining with unvulcanized rubber a vulcanizing agent, a mercapto benzo thiazole accelerator which normally promotes at least partial vulcanization below 110° C., and a substituted benzoic acid compound to inhibit vulcanization below 110° C. selected from the group of compounds having the formula

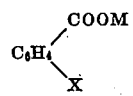

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

3. A process of treating rubber which comprises combining with unvulcanized rubber a vulcanizing agent, a mercapto aryl thiazole accelerator which normally promotes at least partial vulcanization below 110° C., and a mono-ortho-substituted benzoic acid compound to inhibit vulcanization below 110° C. selected from the group of compounds having the formula

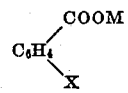

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

4. A process of treating rubber which comprises combining with unvulcanized rubber a vulcanizing agent, a mercapto benzo thiazole accelerator which normally promotes at least partial vulcanization below 110° C., and a mono-ortho- substituted benzoic acid compound to inhibit vulcanization below 110° C. selected from the group of compounds having the formula

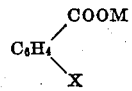

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

5. A process of treating rubber which comprises combining with unvulcanized rubber a vulcanizing agent, mercapto benzo thiazole, and a mono-ortho-substituted benzoic acid compound to inhibit vulcanization below 110° C.

selected from the group of compounds having the formula

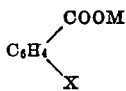

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

6. A process of treating rubber which comprises combining with unvulcanized rubber a vulcanizing agent, hexamethylene benzyl mercapto benzo thiazole and a mono-ortho-substituted benzoic acid compound to inhibit vulcanization below 110° C. selected from the group of compounds having the formula

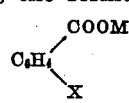

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

7. A process of treating rubber which comprises combining with unvulcanized rubber a vulcanizing agent, a mercapto aryl thiazole accelerator which normally promotes at least partial vulcanization below 110° C., and anthranilic acid in an amount sufficient to substantially inhibit vulcanization below 110° C. but insufficient to substantially inhibit vulcanization at temperatures above 110° C.

8. A process of treating rubber which comprises combining with unvulcanized rubber a vulcanizing agent, a mercapto aryl thiazole accelerator which normally promotes at least partial vulcanization below 110° C., and zinc salicylate in an amount sufficient to substantially inhibit vulcanization below 110° C. but insufficient to substantially inhibit vulcanization at temperatures above 110° C.

9. A process of treating rubber which comprises combining with unvulcanized rubber a vulcanizing agent, a mercapto aryl thiazole accelerator which normally promotes at least partial vulcanization below 110° C., and salicylic acid in an amount sufficient to substantially inhibit vulcanization below 110° C. but insufficient to substantially inhibit vulcanization at temperatures above 110° C.

10. A rubber composition having incorporated therein prior to vulcanization a vulcanizing agent, a mercapto benzo thiazole accelerator which normally promotes at least partial vulcanization below 110° C., and a substituted benzoic acid compound to inhibit vulcanization below 110° C. selected from the group of compounds having the formula

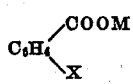

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

11. A rubber composition having incorporated therein prior to vulcanization a vulcanizing agent, a mercapto benzo thiazole accelerator which normally promotes at least partial vulcanization below 110° C., and a mono-ortho-substituted benzoic acid compound to inhibit vulcanization below 110° C. selected from the group of compounds having the formula

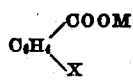

wherein M is a radical of the group consisting of hydrogen, ferrous iron, calcium, cadmium, magnesium, barium, lead, aluminum and zinc, and X is a radical of the group consisting of —NH₂, —OH, —CH₃ and —Cl, in an amount sufficient to substantially inhibit vulcanization below 110° C. but insufficient to substantially inhibit vulcanization at temperatures above 110° C.

CARL S. WILLIAMS.